United States Patent [19]

Vermij

[11] Patent Number: 4,746,784

[45] Date of Patent: May 24, 1988

[54] METHOD OF ATTACHING A LEAD TO A METAL END CAP OF A SAFETY FUSE

[75] Inventor: Leendert Vermij, Buren, Netherlands

[73] Assignee: Littelfuse-Tracor, B.V., Utrecht, Netherlands

[21] Appl. No.: 871,112

[22] Filed: Jun. 5, 1986

[30] Foreign Application Priority Data

Jun. 11, 1985 [NL] Netherlands .................... 8501677

[51] Int. Cl.⁴ .............................................. B23K 26/00
[52] U.S. Cl. ................................ 219/121 LD; 29/623; 337/232; 337/252; 338/215
[58] Field of Search ................. 219/121 LC, 121 LD, 219/121 EC, 121 ED; 338/329, 215, 274, 273, 233; 337/252, 232; 29/619, 623

[56] References Cited

U.S. PATENT DOCUMENTS

| | | | |
|---|---|---|---|
| 3,793,604 | 2/1974 | Duggan et al. | 338/329 X |
| 3,911,246 | 10/1975 | Drinkard, Jr. | 219/85 R X |
| 4,016,527 | 4/1977 | Francis et al. | 338/329 X |
| 4,320,281 | 3/1982 | Cruickshauk et al. | 219/121 LD |
| 4,587,395 | 5/1986 | Oakley et al. | 219/121 LD |

FOREIGN PATENT DOCUMENTS

| | | | |
|---|---|---|---|
| 2505871 | 8/1976 | Fed. Rep. of Germany | 338/215 |
| 2531291 | 1/1977 | Fed. Rep. of Germany | 338/215 |

OTHER PUBLICATIONS

J. B. Harris, IBM Technical Disclosure Bulletin, "Solder Planarity Device", vol. 14, No. 9, Feb. 1972, p. 2773.

Primary Examiner—C. L. Albritton
Attorney, Agent, or Firm—Russell E. Hattis; Stephen R. Arnold

[57] ABSTRACT

A method of attaching a lead to a metal end cap of an otherwise complete miniature-type safety fuse having a fuse element secured to the interior of said end caps by connecting means, is characterized in that the attaching is effected by a soldering operation which comprises holding one end of said lead against said end cap, wherein the region where attachment is to take place there is a given amount of solder, and supplying to said region a metered amount of energy in the form of one or more energy pulses producing over a given period enough total energy to melt said quantity of solder, but of insufficient total energy to penetrate through said end cap and adversely affect the bonding of said fuse element thereto.

10 Claims, 1 Drawing Sheet

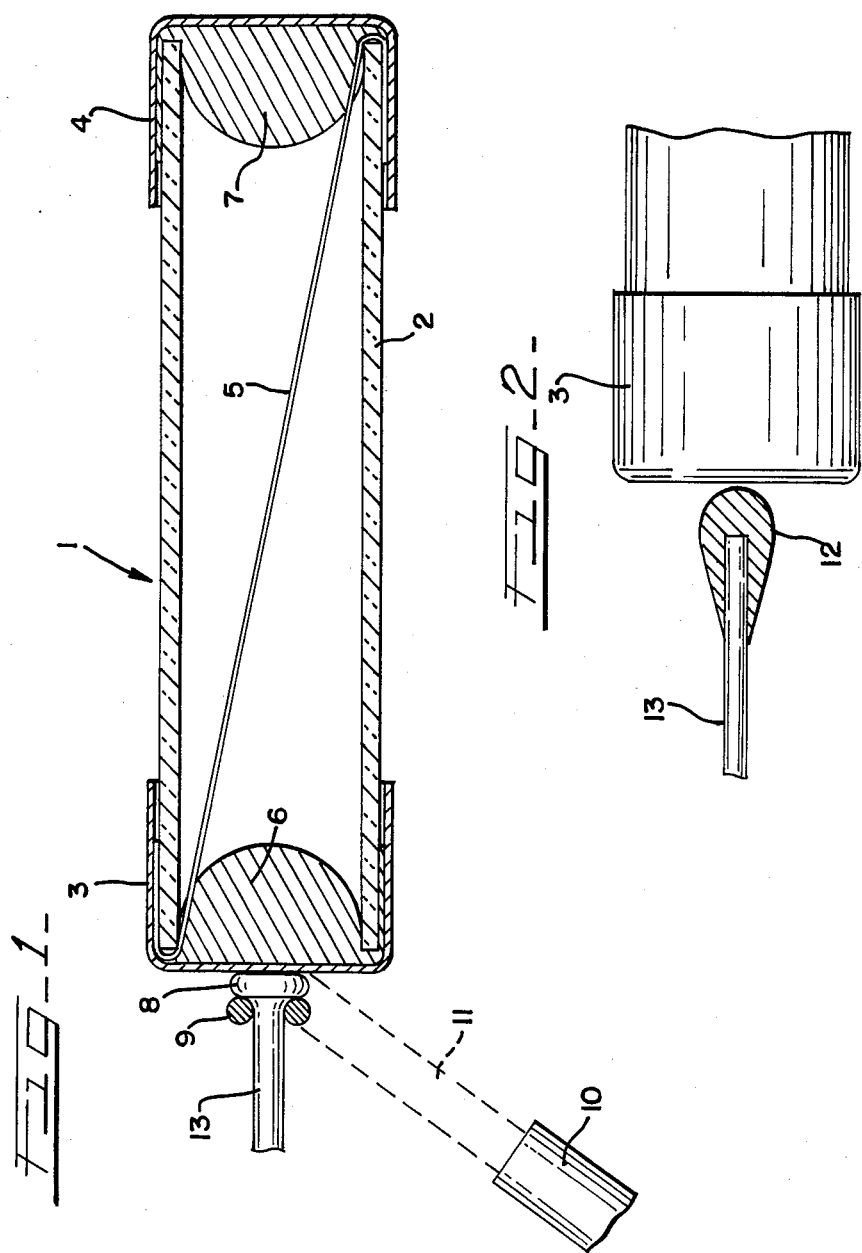

METHOD OF ATTACHING A LEAD TO A METAL END CAP OF A SAFETY FUSE

DESCRIPTION

Technical Field

This invention relates to a method of attaching a lead to a metal end cap of a miniature-type safety fuse that is otherwise completed.

BACKGROUND OF THE INVENTION

For many uses, in particular in the electronics industry, it is desirable to have safety fuses of the miniature or subminiature type (commonly consisting of a generally cylindrical housing provided with two metal end caps, between which a fuse link is secured), which are provided with leads connected to the end caps.

Hitherto two different methods have been used in practice for securing such so-called pig-tails to safety fuses. The first method consists of using additional end caps previously provided with a pig-tail, for example, by welding. Such caps already provided with a lead are pressed onto the end caps of the completed safety fuse. The interior dimensions of the additional end cap should be such that the end cap closely fits the end cap of the safety fuse. One disadvantage of this method is that an additional end cap, and hence more material, is required, while further dimensions of the parts concerned should be accurately controlled to prevent the additional end cap from becoming detached from the safety fuse end cap in operation.

Another method at present being employed is the use, during the manufacture of a safety fuse, of end caps already provided with a pig-tail, for example, by welding. However, an automatic production process for the manufacture of safety fuses using end caps already provided with a pig-tail is inconvenient because the pig-tails normally obstruct the handling of the fuse parts during assembly; at any rate it presents problems which do not occur when flat end caps are used during fuse assembly.

To avoid the problems encountered in the prior methods, it has already been considered to secure leads to completed safety fuses by welding such leads directly to the end caps of an otherwise completed safety fuse. Welding leads to an end cap of a safety fuse, however, is difficult, as welding gives rise to locally high temperatures also on the inside of the end cap. As a result, the solder on the inside will locally melt and evaporate, owing to which the fuse element or fuse link is apt to become detached from the end cap. It is even possible that owing to the local excessive heating, the solder explodes, as it were, and is thus blown far into the housing of the safety fuse. End caps for safety fuses are commonly made of nickel-plated brass, which nickel is commonly applied galvanically. Such end caps are of good quality and cheap. It is, however, very difficult, if not impossible, to produce a reliable connection between a lead and such an end cap by means of welding. This problem is additional to the above impossibility of welding to a completed safety fuse. The problem last mentioned can only be solved by selecting end caps of silver-plated copper, unplated copper and other materials. Such end caps are indeed used in the above methods of making safety fuses with pig-tails.

It is an object of the present invention to provide a method by which socalled pig-tails can be attached to the end caps of completed safety fuses without the occurrence of any of the problems mentioned hereinbefore and without any limitation in the choice of the material of the end cap.

SUMMARY OF INVENTION

The object contemplated is achieved, according to the invention, by a method in which the attaching is effected by a soldering operation which comprises holding the pig-tail-forming wire against the end cap, using the required amount of solder and optionally flux, and supplying a metered amount of energy only to the area to be soldered.

By means of the method according to the invention, it has proved to be possible to attach leads to otherwise completed safety fuses without any damage to the fuse element or interference with the connection between the fuse element and the end cap. Now, it is already known that the amount of energy required for making a reliable connection between a wire and a metal surface using the minimum required amount of solder per unit volume is much less than the amount of energy for making a welded joint. It is still to be expected, however, that in a normal soldering process so much heat is locally required when a wire is soldered to an end cap of a completed safety fuse that the solder on the inside of the end cap at the position of the soldering area on the outside will melt, so that the fuse link or the fuse element is apt to become detached. However, by supplying a metered amount of energy only to the area to be soldered, in accordance with this invention, and naturally ensuring that the correct amount of solder and optionally flux are present at, or closely adjacent to, the areas to be connected, a good soldering joint can be effected without the risk of the solder within the end cap being melted, and hence the fuse element becoming detached. By controlling the supply of energy in accordance with the invention, it can be achieved that just so much energy is supplied during just so long a period of time as to effect correct soldering.

The supply of a metered quantity of energy to the area to be soldered only can be effected, in accordance with this invention, in several ways. Suitably, the energy is supplied, for example, by means of the method according to the preferred form of the invention, by a pulsing Nd-YAG-laser providing laser pulses having a pulse energy of at least 10 Joules and a pulse duration longer than 10 milliseconds to solder tin-plated copper wires in a thickness of no more than 0.9 mm to nickel-plated end caps that are 0.2–0.25 mm thick. If thicker wire or end caps are used, then other amounts of energy would be used.

According to another embodiment of the method according to the invention, the metered amount of energy is supplied to the area to be soldered using pulsed resistance heating by means of discharge pulses from a capacitor. In yet another embodiment, the metered amount of energy is supplied to the area to be soldered by means of a pulsed arc discharge, with the area to be soldered being positioned in the focal point of a lens or mirror system to concentrate the energy in that point.

It is noted that soldering using a laser to supply the required energy is known per se, for example, from European Patent Application No. 0 113 895. A system for soldering with short pulses, providing the required energy by resistance heating is known per se from Netherlands Patent Application No. 8301585. A method of soldering by means of metered concentrated infrared radiation is described in European Patent No. 0 002 884. Netherlands Patent Application No. 7905090, finally, describes a welding method in which electrical arc heating is used by means of a capacitor discharge. None of the publications referred to, however, relates to the attaching of leads to completed safety fuses, and these publications do not, therefore, suggest that welding while supplying a metered amount of energy does not, but soldering in that way does, lead to a solution of the problems outlined.

The method according to the invention can be used with or without using a flux. This depends on the nature of the metal of the parts to be connected, the soldering material and the ambient parameters (such as temperatures, pressure, any surrounding gas, and the like).

The method according to the invention lends itself extremely well to mass production of safety fuses provided with leads.

In a preferred embodiment of the method according to the invention, the end of the lead to be attached is previously upset, i.e., thickened. Suitably, the amount of solder required can then be provided by putting a ring of soldering material around the end of the lead, which ring is retained by the upset part of the end.

The required amount of solder can also be suitably provided by previously attaching a drop of solder to the end of the lead.

DESCRIPTION OF THE DRAWINGS

FIG. 1 is a cross-sectional view of a safety fuse and lead to illustrate one embodiment of the method according to the invention.

FIG. 2 is a similar view of some details to illustrate another embodiment of the method according to the invention.

DESCRIPTION OF THE INVENTION

FIG. 1 shows a safety fuse 1 which must be provided with a lead 2. The safety fuse consists of a cylindrical glass housing 13 closed at opposite ends by end caps 3,4 fitting over the ends of housing 13. In housing 13, the fuse element 5, which in the case illustrated consists of a thin wire, is positioned diagonally with the ends of wire 5 being flexed around the edge of housing 13 and clamped between the respective end caps 3,4 and the outside of housing 13. Disposed in the end caps are solder plugs 6,7, which provide for a firm connection of wires 5 to the end caps 3,4 respectively and for a sealing attachment, or at any rate a seal of housing 13 relative to the end caps 3,4.

In the embodiment of the method according to the invention here illustrated, lead 2 is attached to safety fuse 1 as follows. Lead 2 has been previously upset, so that it is provided with a upset part 8 at the end to be attached. Provided around lead 2 is a ring 9 of soldering material. The upset part 8 of lead 2 ensures that ring 9 cannot fall from the wire. Lead 2 is held with the upset part 8 in contact with the outer wall of end cap 3. Subsequently, from a laser source 10, a laser beam 11 is directed at the upset portion 8 of lead 2, the adjoining wall portion of end cap 3 and the ring 9 of solder. A pulsing laser source 10 is used, and the laser beam is prefereably directed at an angle to the parts referred to. Using a single laser pulse with a duration of approximately 15 milliseconds, a good joint is effected between lead and end cap. It is also possible, however, for the sake of certainty, after using the single laser pulse, to rotate the laser source 10 in the plane perpendicular to the plane of drawing, and to issue a second or even third laser pulse at a different location along the circumference of the thickened portion 8 of the lead.

If the use of a flux is desirable in the soldering operation according to the embodiment of the method of the invention as described above, this can be effected in a simple manner, for example, by dipping the end of the lead in thin-liquid flux.

FIG. 2 illustrates a different embodiment of the method according to the invention. In that embodiment, a lead 2 with a flat end is used. Using, for example, a soldering iron, a bead 12 of soldering material is secured to the end of wire 2. Securing wire 2 to end cap 3 is further effected as described with reference to FIG. 1.

It will be clear that the soldering material can be supplied to the area being soldered in a different manner from that illustrated in FIG. 1 or FIG. 2, for example, in the form of wire.

By means of the method according to the invention, leads of tin-plated copper with a diameter of 0.6 mm. and of 0.8 mm. were attached to safety fuses of the type illustrated in FIG. 1 with dimensions of 20 mm. length and 5 mm diameter. The end caps of these safety fuses had a wall thickness of 0.25 mm and consisted of brass 63/37 with a galvanically applied nickel-plating of 3-5-/um. thick. A type of solder was used with a melting point higher than 300° C. (silver-lead solder). It is noted that, from the point of view of the method according to the invention, solder with a lower melting point could also be used. With a view to subsequent uses of the safety fuses, for example, soldering into a print by means of a soldering bath, a lower melting point is now, however, always desirable.

The energy was supplied to the area to be soldered from a pulsing Nd-YAG laser with a pulse energy of 16-34 Joules. Using one laser pulse of 15 milliseconds, good joints were made. The use of two or three pulses spaced along the circumference of the joint also produced good connections. Best results were achieved using leads with a thickened end. With leads having a flattened end only, however, acceptable joints were still realized. As good and acceptable joints were regarded, the joints satisfying the requirements specified in the IEC publication 68-2-21, part 2.

I claim:

1. A method of attaching a lead to a metal end cap of an otherwise complete miniature-type safety fuse having a fuse element secured to the interior of said end caps by connecting means, characterized in that the attaching is effected by a soldering operation which comprises holding one end of said lead against said end cap, wherein the region where attachment is to take place there is a given amount of solder, and supplying to said region a metered amount of energy in the form of one or more energy pulses producing over a given period enough total energy to melt said quantity of solder, but of insufficient total energy to penetrate through said end cap and adversely affect the bonding of said fuse element thereto.

2. A method as claimed in claim 1, characterized in that said metered amount of energy is supplied to said region to be soldered by means of a pulsing laser.

3. A method as claimed in claim 2, characterized by using a pulsing Nd-YAG laser providing laser pulses having a pulsed energy of at least 10 Joules over a period no longer than 10 milliseconds to solder tin-plated copper wires of a greater thickness to nickel-plated end caps.

4. A method as claimed in claim 1, characterized in that said metered amount of energy is supplied to said region to be soldered using resistance heating by means of discharge pulses from a capacitor.

5. A method as claimed in claim 1, characterized in that said metered amount of energy is supplied to said region to be soldered by means of a pulsed arc discharge, with said region to be soldered being positioned in the focal point of a lens or mirror system to concentrate the energy in that point.

6. A method as claimed in claim 1 characterized in that said end of said lead is previously upset.

7. A method as claimed in claim 1 characterized in that said end of said lead is previously upset and wherein said given amount of solder is provided by putting a ring of solder material around said end of said lead, which ring is retained by the upset part of the end.

8. A method as claimed in claim 1 characterized in that said given amount of solder is provided by previously attaching a drop of solder to said end of said lead.

9. A method as claimed in claim 1 characterized in that a quantity of soldering flux is applied to said area to be soldered.

10. The method of claim 1 wherein said end caps are nickel-plated copper.

* * * * *